United States Patent
Ostertag et al.

(10) Patent No.: US 7,188,340 B2
(45) Date of Patent: Mar. 6, 2007

(54) HYBRID TREE FOR MIXED USER INTERFACE ELEMENTS AND SEQUENTIAL DATA

(75) Inventors: Peter Francis Ostertag, Woodinville, WA (US); Michael J. Hillberg, Kirkland, WA (US); Jeffrey L. Bogdan, Redmond, WA (US); Robert A. Relyea, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 10/186,050

(22) Filed: Jun. 28, 2002

(65) Prior Publication Data

US 2004/0003348 A1 Jan. 1, 2004

(51) Int. Cl.
*G06F 9/45* (2006.01)
*G06F 7/00* (2006.01)
*G06F 17/00* (2006.01)

(52) U.S. Cl. ...................... 717/144; 707/102
(58) Field of Classification Search ........ 715/513–515; 717/144; 707/102
See application file for complete search history.

(56) References Cited

U.S. PATENT DOCUMENTS

| | | | |
|---|---|---|---|
| 6,029,170 A * | 2/2000 | Garger et al. ............... | 707/100 |
| 6,061,679 A | 5/2000 | Bournas et al. | |
| 6,169,546 B1 | 1/2001 | Bogdan | |
| 6,169,984 B1 | 1/2001 | Bogdan | |
| 6,249,284 B1 | 6/2001 | Bogdan | |
| 6,505,205 B1 * | 1/2003 | Kothuri et al. ............. | 707/100 |
| 6,662,342 B1 | 12/2003 | Marcy | |
| 6,671,853 B1 | 12/2003 | Burkett et al. | |
| 6,772,165 B2 | 8/2004 | O'Carroll | |
| 6,775,678 B1 | 8/2004 | Hillberg et al. | |
| 6,883,137 B1 | 4/2005 | Girardot et al. | |
| 2002/0138517 A1 | 9/2002 | Mory et al. | |
| 2003/0028540 A1 * | 2/2003 | Lindberg et al. ............. | 707/100 |
| 2003/0195885 A1 * | 10/2003 | Emmick et al. ................ | 707/8 |

OTHER PUBLICATIONS

"XSLTC Internal DOM", The Apache Software Foundation, copyright 2001 as retrieved on the Internet from http://xml.apache.org/xalan-j/xsltc/xsltc_dom.html, dated Sep. 23rd, 2001 as retrieved from the Wayback Machine.*

(Continued)

*Primary Examiner*—Tuan Dam
*Assistant Examiner*—John J. Romano
(74) *Attorney, Agent, or Firm*—Klarquist Sparkman, LLP

(57) ABSTRACT

A hybrid tree data structure is suitable for use in scenarios involving intermingled text and user interface elements. Trees of two different types can be combined via one or more proxy nodes. For example, one type can be efficient at processing user interface elements and another can be efficient at processing text. Operations suitable for user interface elements can be efficiently performed on portions of the hybrid tree having user interface elements, and operations suitable for sequential data can be efficiently performed on portions of the hybrid tree having sequential data. The structure is thus suited for representing documents or graphical user interfaces. A hypertext document can be represented via the hybrid tree to enable more efficient searching, navigation, rendering, or editing of the document. Hybrid tree services can be provided by an operating system service.

32 Claims, 14 Drawing Sheets

OTHER PUBLICATIONS

Turbak, "Slivers: computational Modularity via Synchronized Lazy Aggregates," http://nike.wellesley.edu/~fturbak/pubs/phd/, pp. 1-2, Apr. 24, 2002.

Yao, "Tree Structures Construction Using Key Densities," *ACM Proceedings of the 1975 Annual Conference*, pp. 337-342, 1975.

"XBL-XML Binding Language," http://www.w3.org/TR/Xbl/, Hyatt (ed.), pp. 1-35, Feb. 23, 2001.

Henrich, "A Hybrid Split Strategy for k-d-Tree Based Access Structures," *ACM Proceedings of the Fourth ACM Workshop on Advances in Geographic Information Systems*, pp. 1-8, 1997.

Lewis et al., *Data Structures and their Algorithms*, Harper Collins Publishers, New York, NY, pp. 1-509, 1991.

Manohararajah, "Parallel Alpha-Beta Search on Shared Memory Multiprocessors," pp. 1-92, Apr. 24, 2002.

McEneaney, "Visualizing and Assessing Navigation in Hypertext," *ACM Proceedings of the Tenth ACM Conference on Hypertext and Hypermedia: Returning to our Diverse Roots*, pp. 61-70, 1999.

Samet, *The Design and Analysis of Spatial Data Structures*, Addison-Wesley, Reading, MA, pp. 240-257, 1990.

"XForms- The Next Generation of Web Forms," http://www.w3.org/MarkUp/Forms/, pp. 1-6, 2001.

"W3C, XForms 1.0, W3C Working Draft," http://www.w3.org/TR/2002/WD-xforms-20020118, pp. 1-97, Jan. 18, 2002.

"Introduction to Markup Services," http://msdn.microsoft.com/workshop/browser/mshtml/overview/intromarkupsvc.asp, pp. 1-12, Feb. 12, 2002.

"Microsoft Brandishes its Trident," http://news.com.com/2100-1001-239879.html?tag=mainstry, pp. 1-2, Oct. 21, 1996.

"What is XUL?" Chapter 1, pp. 1-18, Jul. 10, 2001.

"Splay tree," http://searchdatabase.techtarget.com/sDefinition/0,,sid13_gci511191,00.html, pp. 1-3, Feb. 12, 2002.

Tamassia et al., "Data Structures," *The Computer Science and Engineering Handbook*, Tucker, Jr. (ed.), pp. 86-110, 1997.

Khuller et al., "Graph and Network Algorithms," *The Computer Science and Engineering Handbook*, Tucker, Jr. (ed.), pp. 203-225, 1997.

\* cited by examiner

PRIOR ART

PRIOR ART

FIG. 3

YOU ARE THE TREE OF MY DREAMS.

PRIOR ART

PRIOR ART

```
<BODY>
 <CONTROL ID='A'/>
 YOU ARE THE <B> BOLD </B> TREE
 <BUTTON ID='E'/>
</BODY>
```

```
<BODY>
  <AGGREGATE CONTROL ID='A'>
    <SUBCONTROL ID = 'B'/>
    <SUBCONTROL ID = 'C'/>
  </AGGREGATE CONTROL>
  <P>
    TEXT WITH <B> BOLD </B>
    <BUTTON ID = 'D'/>
    STUFF
  </P>
  <BUTTON ID = 'E'/>
</BODY>
```

HYBRID TREE FOR MIXED USER INTERFACE ELEMENTS AND SEQUENTIAL DATA

TECHNICAL FIELD

The technical field relates to data structures for use in conjunction with computer software, and more particularly to a hybrid tree data structure.

BACKGROUND OF THE INVENTION

In the field of computer science, programmers have developed various data structures to deal with common problems. Data structures can be fashioned to help conserve processing resources and process data more efficiently. Choosing the proper data structure is thus an important part of software design.

For example, in the case of representing user interface elements that are to be displayed as part of a user interface, a tree type sometimes called a "simple tree" can be used. Nodes in the tree can represent the user interface elements. The nodes can contain various pointers to facilitate easy navigation of the elements via the tree.

FIG. 1 shows an example of a user interface 100 with elements 112, 122, 124, 126, 128, 132, 134, and 136. FIG. 2 shows a corresponding exemplary simple tree 200 for representing the user interface 100 of FIG. 1. The simple tree 200 includes the elements 212, 222, 224, 226, 228, 232, 234, and 236, each of which correspond to a user interface element shown in FIG. 1.

The simple tree 200 preserves the hierarchical relationship between the elements. Nodes in the simple tree 200 include a pointer to a parent node, if any, the previous node (e.g., sibling), if any, the next node (e.g., sibling), if any, and the first child node, if any. Accordingly, navigation in the user interface is easily accomplished because parent, adjacent (e.g., next sibling), and child nodes are easily found.

Separately, in a scenario involving representation of formatted text, a tree type sometimes call a "sequential tree" can be used. FIG. 3 shows an example of formatted text 300. In the example, the word "TREE" has been formatted to be bold.

FIG. 4 depicts an exemplary sequential tree 400 for representing the formatted text 300 of FIG. 3. The sequential tree 400 includes the tree nodes 412 and 422, the linking data structure 430 (i.e., nodes 432, 434, 435, 436, and 438), and the text store 452. The linking data structure 430 can be implemented as a binary splay tree to facilitate processing text in the text store 452.

The nodes of the sequential tree can include formatting nodes, such as the bold node 422. Text enclosed by the bold node is designated to be formatted as bold. Given a particular character position, navigation can be easily accomplished to the enclosing formatting nodes in a bottom-up fashion. Also, searching for text is easily accomplished because the text is stored sequentially in the text store 452. The text store 452 can be implemented as a series of linked smaller stores with empty spaces (e.g., null padding) therein so that large blocks of text can be edited while avoiding large copy and move operations.

Although the trees discussed above are suitable for their depicted purposes, there remains room for improvement in utilizing them and other data structures.

SUMMARY OF THE INVENTION

Although there are many data structures available, ever-increasing demands are placed on programmers as they strive to create a richer user experience. For example, text and user interface elements have long been mixed together in user interfaces, but representing mixed text and user interface elements in such a way that facilitates easy rendering, searching, editing, and navigation can be difficult. Accordingly, an efficient way is needed to represent text and user interface elements.

As described herein, a hybrid tree data structure can be used in a variety of scenarios. For example, a hybrid tree data structure can use proxy nodes whereby two tree types can be intermingled in a single data structure. Such an arrangement can be useful, for example, when representing items that intermingle both sequential data (e.g., text) and user interface elements. For example, one tree type can be adapted to efficiently process formatted sequential data (e.g., text) and the other can be adapted to efficiently process user interface elements.

The hybrid tree can be used to represent a document having both text and user interface elements. For example, a hypertext (e.g., HTML) document can be represented by the hybrid tree.

Hybrid tree technology can also be used to represent any user interface. For example, any user interface having text intermingled with user interface elements (e.g., an email program) can be represented. Accordingly, the portions of the user interface having much text (e.g., an email preview pane) can be represented in a tree adapted for efficient text searching while other portions of the user interface (e.g., controls for navigating folders in an email program) can be represented in a tree adapted for efficient user interface navigation.

The two tree types can be a simple tree and a sequential tree. The simple tree is adapted for efficiently handling processing related to user interface elements (e.g., navigation, eventing, property access, and layout operations) because simple parent/child relationships are sufficient to accomplish such processing. The simple tree can be compact because it can be formed by nodes having pointers to parent, first child, next sibling, and previous sibling nodes, if any. It is thus easy to find the children of a node, the parent of a node, or a node next to another node. Navigation can be accomplished in a top-down fashion if desired.

The sequential tree can include a formatting directive tree, a linking data structure (e.g., a splay tree), and the sequential data store. The sequential tree is adapted for efficiently handling processing related to formatted sequential data, such as text (e.g., text layout, text editing, and searches). For example, the sequential tree provides linear access to the text store and the tree includes a linking tree (e.g., a splay tree) that provides fast (e.g., logN-based) access to character positions in the text store and fast access from the character position to the related formatting directive. The text store can be organized as a series of blocks of text, allowing easy insertions and removal of text at arbitrary positions without large copy operations.

Proxy nodes can be used by which a tree of one type can be embedded (e.g., nested) in a tree of a different type. Accordingly, text and user interface elements can be combined into a single, navigable data structure, and the advantages of the two tree types can be preserved even though the two types of data are intermingled (e.g., in a single document).

The hybrid tree can be provided via a service that can place a given node into a tree of the appropriate type transparently to a requesting program. For example, a program can use a single button element instead of two different button elements for two different tree types. Thus, only one object type need be developed. The tree type into which the element is placed can be transparent to the requesting program, or the requesting program can explicitly specify a particular tree type.

Variables for representing tree nodes in a data structure can be used for different purposes depending on the type of tree in which the node resides. For example, the same variable definition can be used for two different purposes: one for user interface element processing, the other for sequential data processing. Nodes from the two tree types and the proxy nodes can derive from the same object class.

Further, spans of data in the sequential data store can be tracked in a quad tree. In this way, searching the spans can be done more efficiently. The boundaries of the quad tree can be one of the spans itself (e.g., a reference to a splay tree). Accordingly, when sequential data (e.g., text) is added to the sequential data store, the boundary will automatically adjust without having to recalculate.

Additional features and advantages will be made apparent from the following detailed description of illustrated embodiments, which proceeds with reference to the accompanying drawings.

BRIEF DESCRIPTION OF THE DRAWINGS

Figure 3:
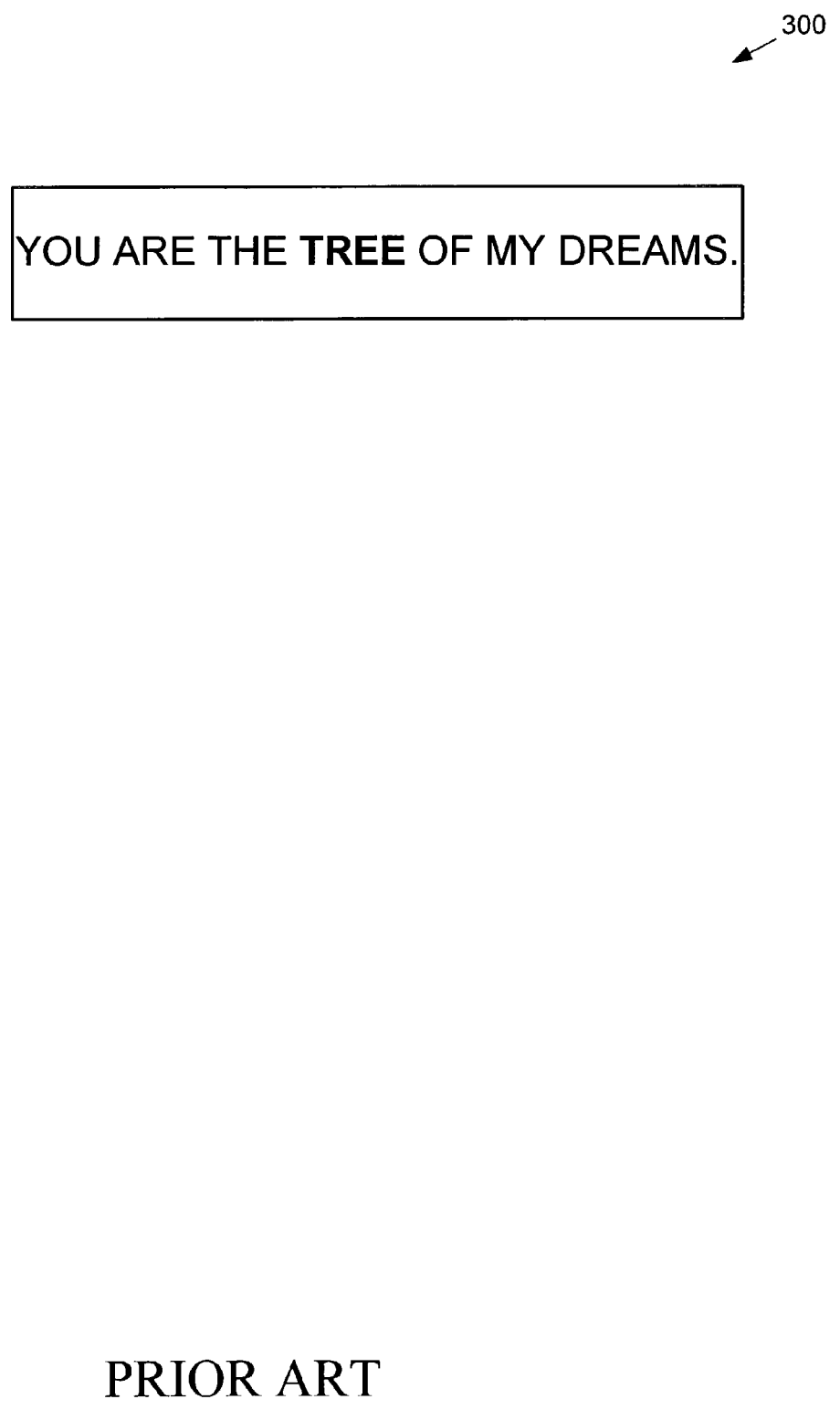

FIG. 3 depicts a prior art sample of formatted text.

DETAILED DESCRIPTION OF THE INVENTION

Overview

To create a hybrid tree, nodes from one tree type can be embedded into the tree of another tree type. For example, proxy nodes can be used to link two trees of different types. Although some of the examples show simple and sequential trees, other tree types can be used. For example, instead of a simple tree, any tree type adapted for efficient processing of user interface elements can be used. Instead of a sequential tree, any tree type adapted for efficient processing of formatted sequential data (e.g., text) can be used.

Although some examples show embedding one tree of a first type into a second tree of a second type, it is possible to have other permutations. For example, any number of trees of a first type can be intermingled with any number of trees of a second type into a single navigable data structure. Nodes forming yet another type (e.g., a third tree type) can also be intermingled in the tree.

Exemplary Hybrid Tree

Figure 1:
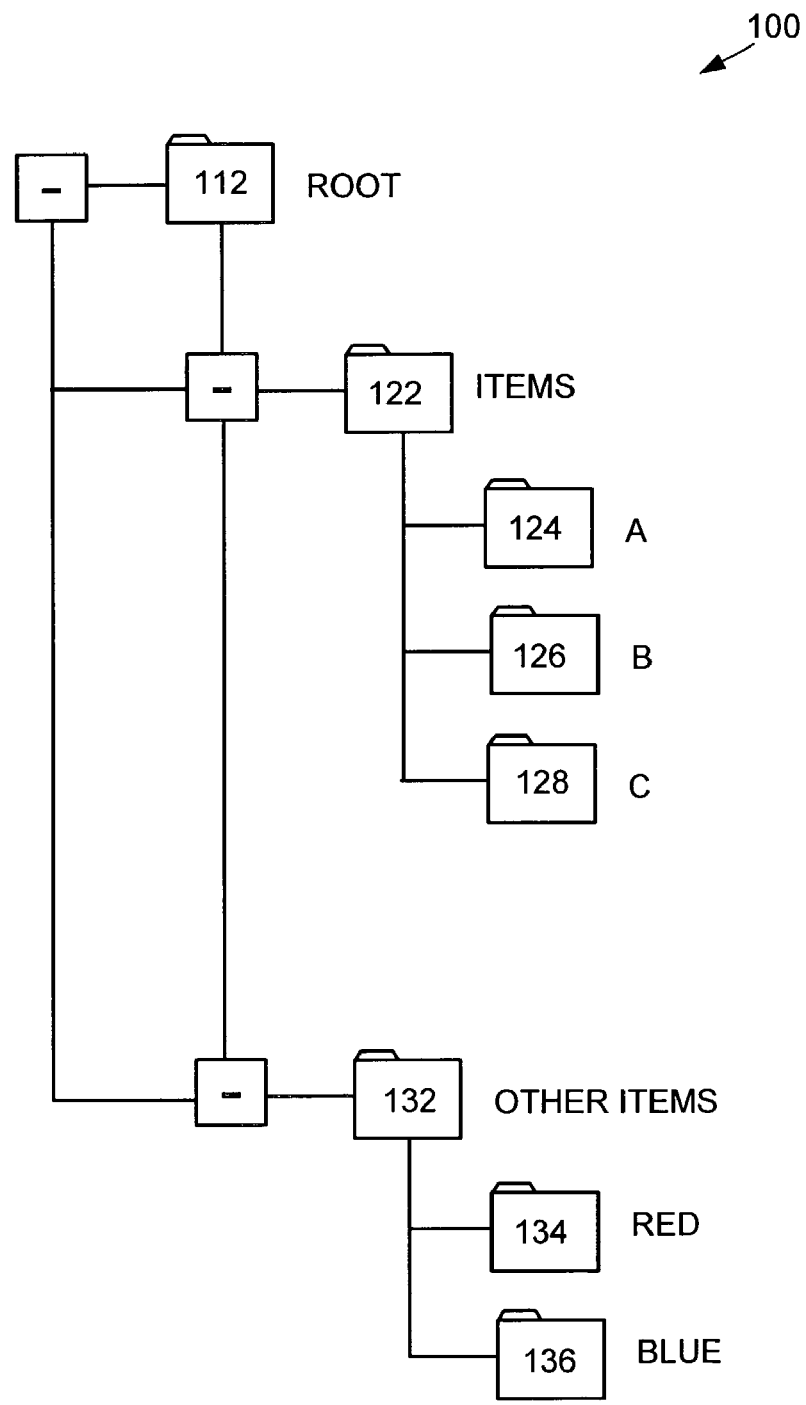
FIG. 1 depicts a prior art user interface.
Figure 2:
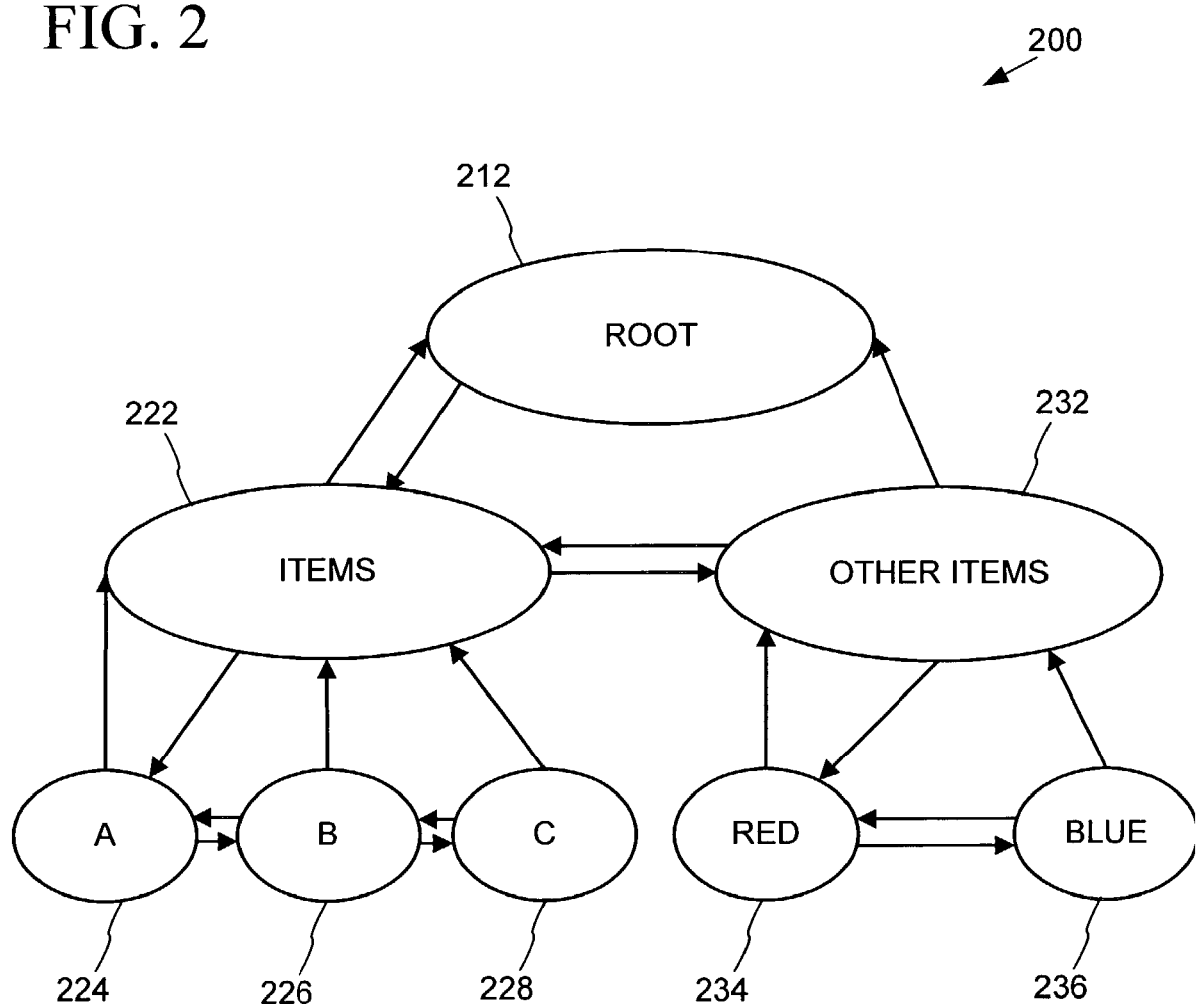
FIG. 2 depicts a prior art simple tree for representing the prior art user interface of FIG. 1.
Figure 4:
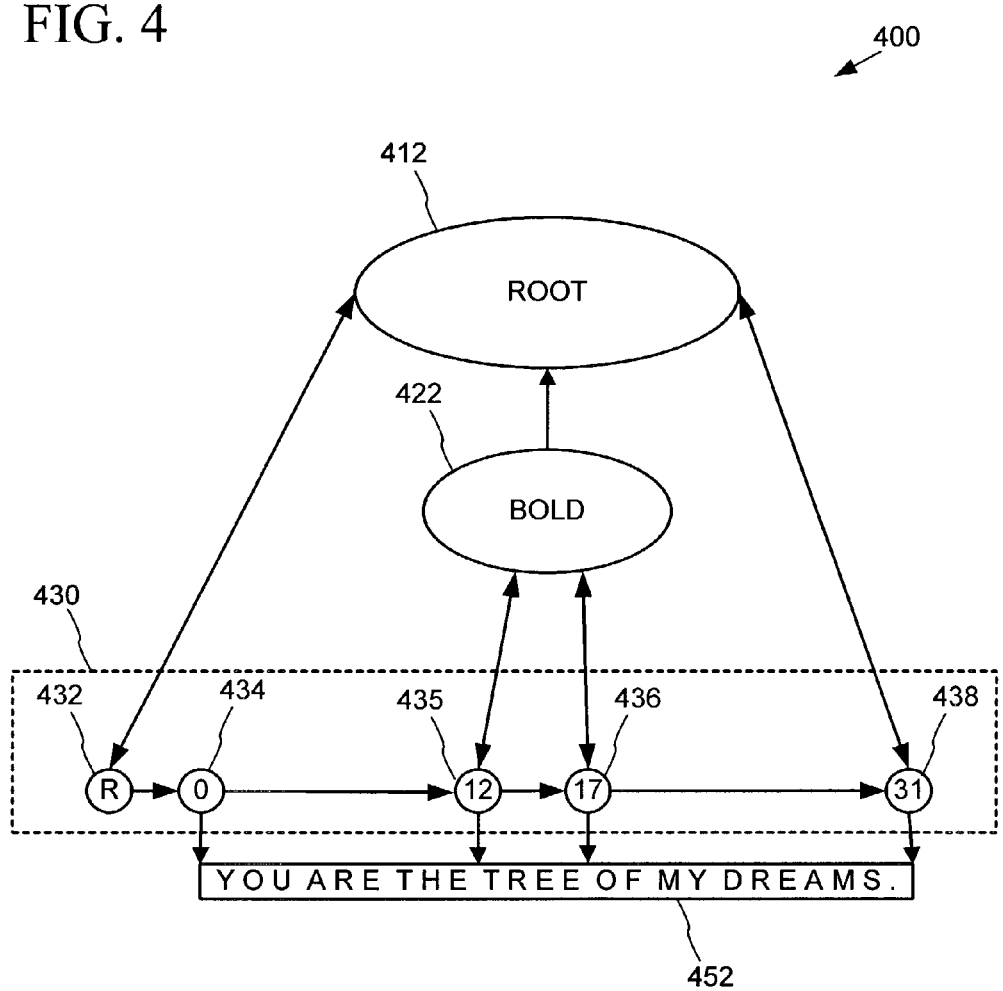
FIG. 4 depicts a prior art sequential tree for representing the prior art sample of formatted text of FIG. 3.
Figure 5:
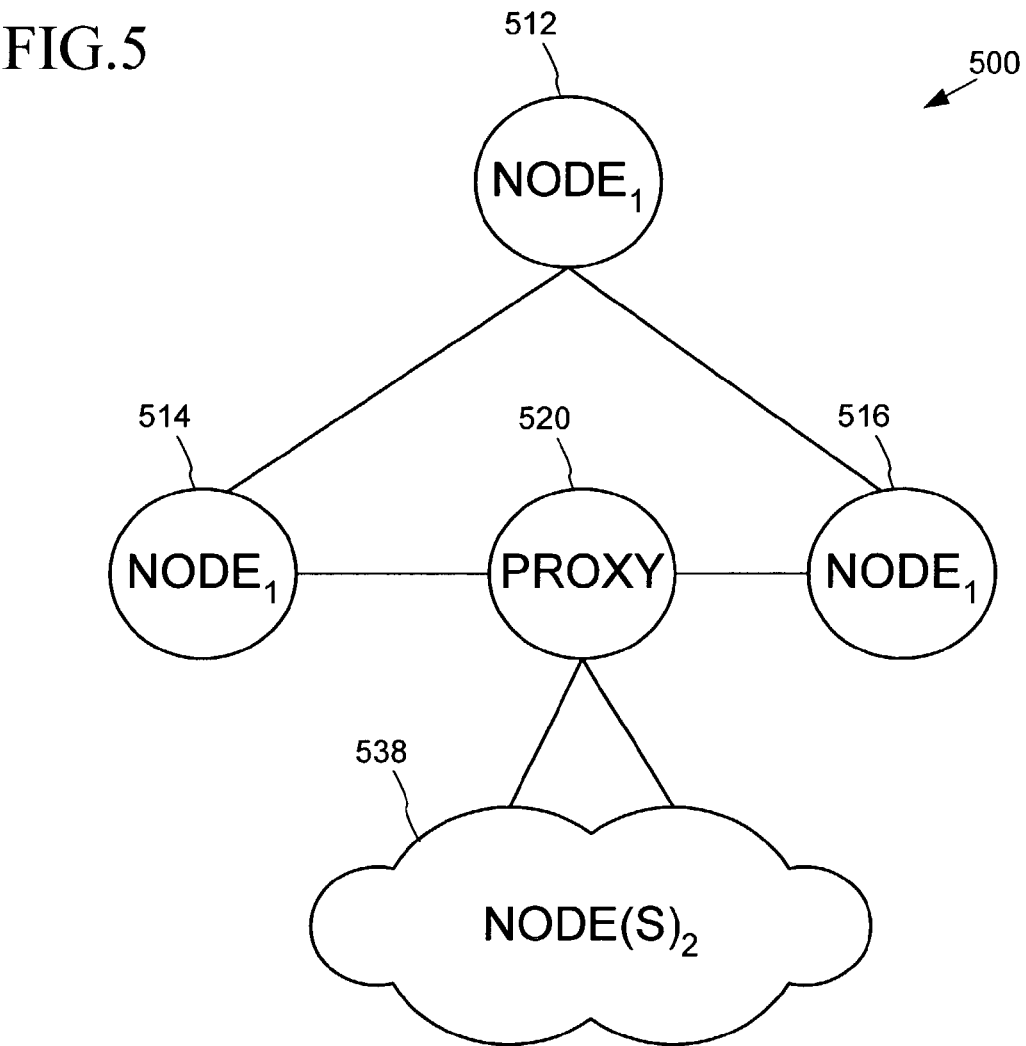
FIG. 5 depicts an exemplary hybrid tree.

FIG. 5 depicts an exemplary hybrid tree 500. In the tree 500, there are nodes 512, 514, 516 of a first tree type, and nodes 538 of a second, other tree type. A proxy node 520 links the nodes of the two tree types together.

In practice, there may be many more nodes, and there may be further nesting of tree types. For example, another tree of the first type may appear under the nodes 538 of the second tree type, and so on. The depicted proxy node 520 places a tree of the second type into a tree of the first type. If desired, a separate type of proxy node can be used to place trees of the first type into trees of the second type. Special or additional pointers in the proxy node 520 can be included so that it can provide dual functionality, if desired.

Additional data and data structures can be associated with the trees. For example, in the case of a tree representing text (e.g., a sequential tree), a text data store can be provided along with other supporting data structures (e.g., linking nodes of a tree to the text data store).

When creating data structures for the nodes of the hybrid tree, the same variables can be used for different purposes, depending on what type of tree the node is from and whether the node is a proxy node. For example, nodes of different types can have the same structure (e.g., a certain number of pointers). A first pointer in a data structure might refer to a root of a containing tree if the node is a proxy, but the same pointer might refer to an adjacent sibling if the node is a node in a tree type (e.g., a simple tree).

Similarly, the nodes can be defined as deriving from the same class (e.g., in a C++ implementation). Additional pointers can be defined for sub-classes if desired.

The hybrid tree 500 can be navigated by traversing the various nodes in various fashion. For example, navigation can be from node to node or from some other structure (e.g., a text data store) into the nodes.

Various functionality can be accomplished via the hybrid tree 500. For example, in a tree representing a document having text, text of the document can be searched. Also, editing, user interface navigation, and rendering functions can be accomplished.

Exemplary Hybrid Tree Method

Figure 6:
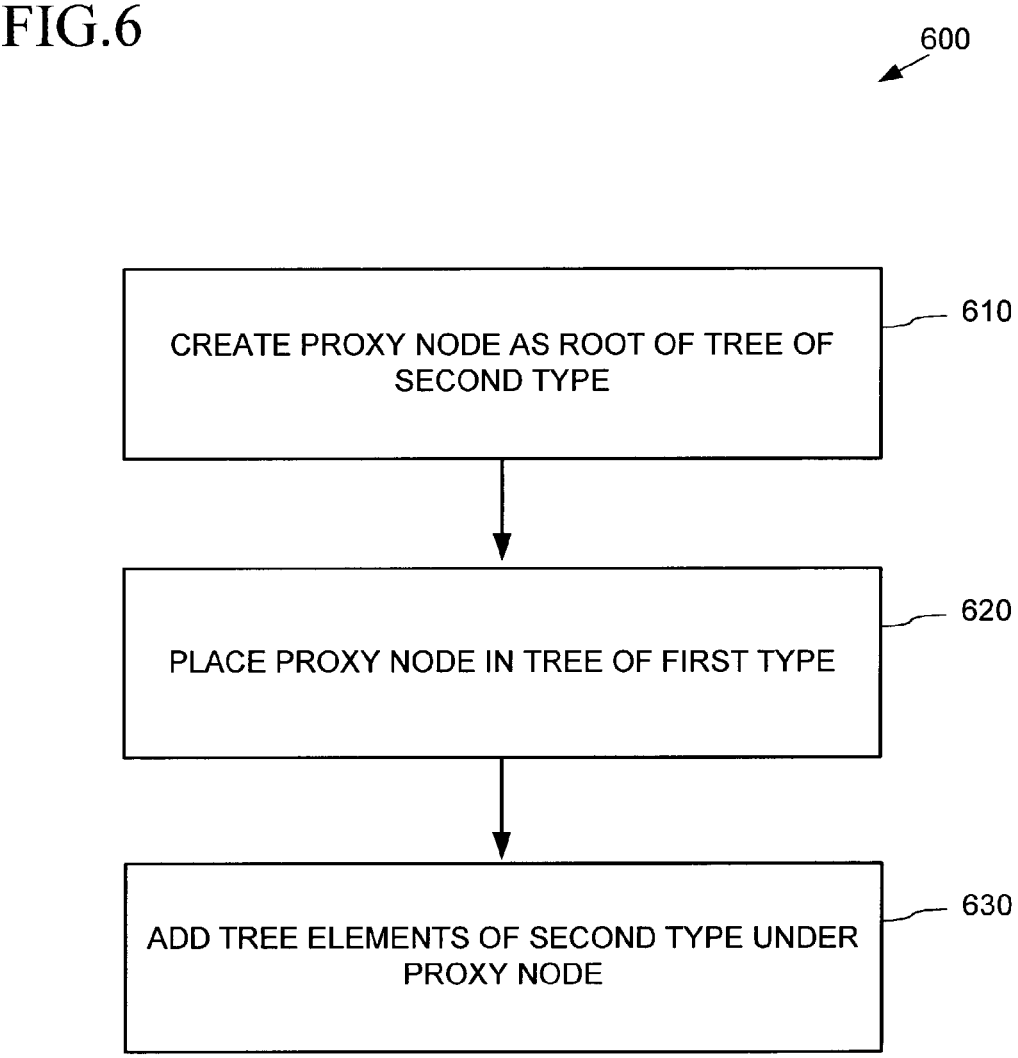
FIG. 6 is a flowchart of an exemplary method for building a hybrid tree.

FIG. 6 depicts and exemplary method 600 for building a hybrid tree. In the example, a tree of a first type already exists, and a tree of a second type is embedded therein. However, other arrangements are possible (e.g., embedding trees of other types or embedding more trees).

At 610, a proxy node is created as the root of the tree of the second type. At 620, the proxy node is placed in the tree of the first type. For example, nodes of the tree of the first type can be made to refer to (e.g., via pointers) to the proxy node.

At 630, the tree elements of the second type are added under the proxy node. In practice, the order of the actions may vary. For example, the tree of the second type can be added to the proxy node before placing the proxy node into the tree of the first type.

In any of the examples described herein, the details of manipulating the various pointers and choosing an appropriate proxy can be handled by a service provided to programs. For example, a program can request that a certain element be placed in a document at a particular position. The service can determine whether a proxy is needed (e.g., whether the appropriate parent is of a different tree type), create a proxy if appropriate, and place the element into the tree.

The details of the hybrid tree structure can be transparent to the requesting program. For example, the requesting program can simply provide the element and request that it be added to the document, without regard to whether the element will reside underneath a proxy node. In this way, a single element type can be used rather than creating multiple representations of an element for each tree type desired.

In special cases, the type of tree desired can be explicitly specified. For example, when inserting a paragraph formatting directive (e.g., the HTML tag "<p>") or a block of formatted text into a tree, it may be desirable to indicate that a sequential tree is desired for the item because such items typically properly belong in a sequential tree.

If desired, the service can provide access to hybrid tree services via an application programming interface (API). Such a service can be provided, for example, as one of many operating system services.

In the case of a simple tree and a sequential tree, nodes representing a simple tree can be stored, nodes representing a sequential tree can be stored, and at least one proxy node can be stored by which the two trees are combined into a single, navigable hybrid data structure.

Exemplary Hybrid Tree: Simple Tree in a Sequential Tree

Hybrid trees can be created using various combinations of simple and sequential trees. For example, a tree can have one or more simple proxies and one or more sequential proxies.

Figure 7:
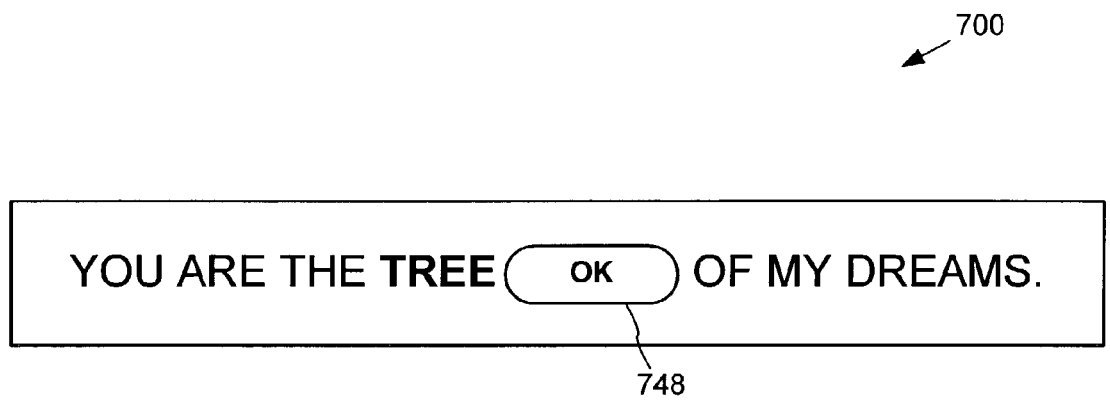
FIG. 7 is exemplary text intermingled with a user interface element.

FIG. 7 shows exemplary text 700. In the example, the text 700 includes an intermingled user interface element 748, and the word "tree" is bolded.

Figure 8:
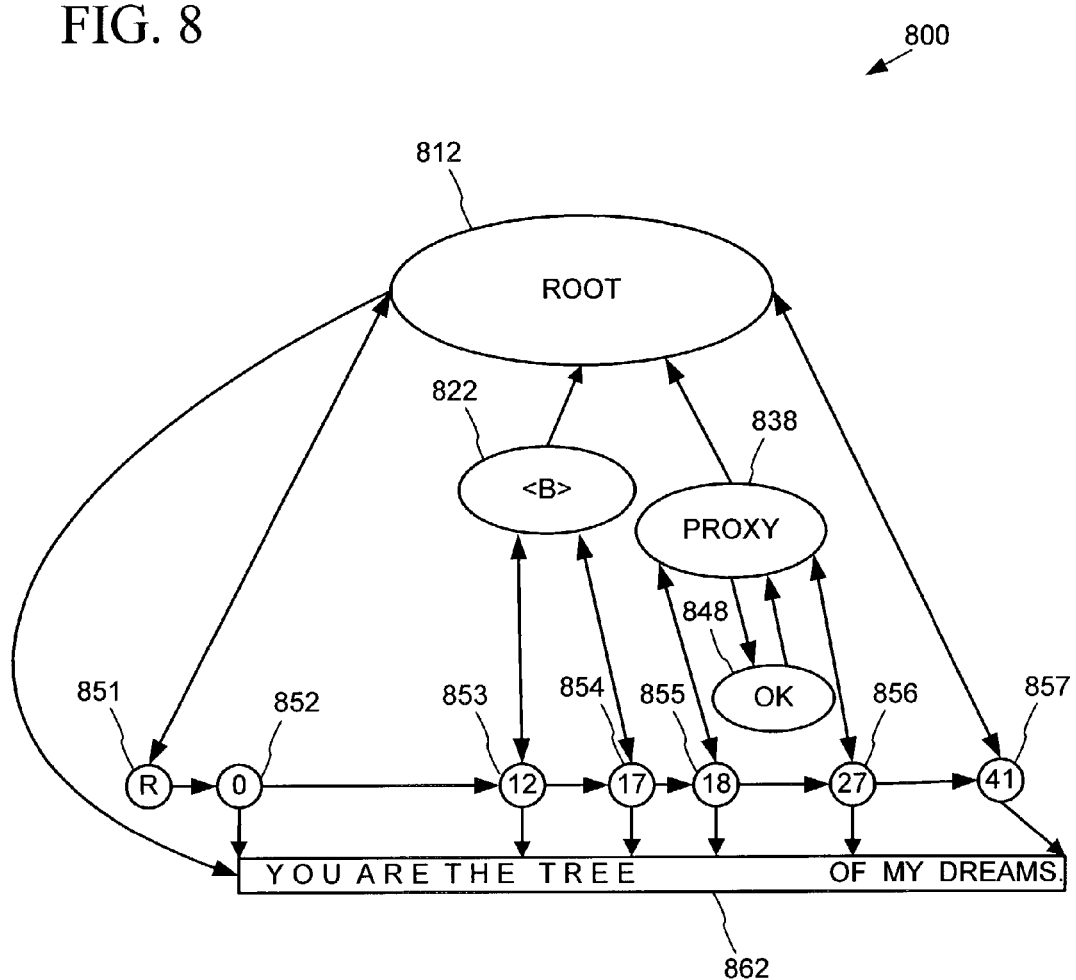
FIG. 8 is an exemplary hybrid tree for representing text intermingled with a user interface element, such as that of FIG. 7.

FIG. 8 depicts an exemplary hybrid tree 800 for representing the intermingled text and user interface element of FIG. 7.

The elements depicted in the tree 800 form a sequential tree, except that embedded within the sequential tree are the proxy element 838 and a simple tree element 848. The simple tree element 848 corresponds to the user interface element 748 (e.g., an "OK" button). In this way, the user interface element 748 is intermingled with the text 700 in the hybrid tree 800.

The sequential data store 862 stores the text (e.g., in unformatted form). Nodes in the sequential tree (e.g., the bold node 822) serve as formatting directives that format spans of text enclosed by them (e.g., the span of text "tree") in the sequential data store 862.

A linking data structure (e.g., the nodes 851–857) associate the formatting directives with the sequential data store 862. In the example, the linking data structure forms a splay tree that also serves as a binary tree by which a particular character position can be readily determined. The root 851 of the linking data structure is referred to by the root of the sequential tree 812. The other nodes of the linking data structure are used to point to particular character positions in the sequential data store 862. Although numbers are shown to indicate a linear position within the sequential data store 862, other implementations are possible. For example, a splay tree can indicate the number of characters in a left sub-tree. In this way, as characters are added to the sequential data store 862, an excessive recalculation is avoided for the linking data structure.

In the example, the proxy node 838 serves the dual purposes of serving as a sequential tree node (e.g., enclosing respective character positions indicated in the linking (e.g., splay) data structure and serving as a simple tree root (e.g., a root for the "OK" button)). Accordingly, the proxy node 838 is sometimes called a "simple proxy" and includes the following: a pointer to its parent, pointers to the linking (e.g., splay) data structure, and a pointer to its first child. Additionally, if the simple proxy is underneath another proxy node (e.g., a sequential proxy as described below), the simple proxy can include a pointer to such other proxy.

In practice, the exemplary hybrid tree 800 can differ significantly in that more or fewer nodes can be present, additional or less text can be present, and additional proxy nodes can be present. Also, the linking data structure can be implemented in various other ways.

Exemplary Hybrid Tree: Sequential Tree in a Simple Tree

Figures 9A, 9B:
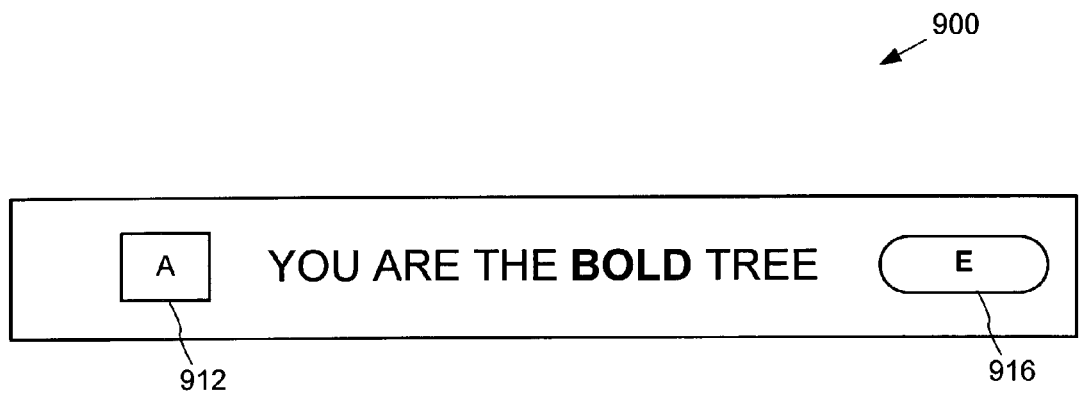
FIG. 9A is other exemplary text intermingled with user interface elements.
FIG. 9B is an exemplary HTML document representing text intermingled with user interface elements, such as that of FIG. 9A.

Any of the examples depicted herein can be used to represent documents constructed according to a markup language (e.g., HTML or XML). FIG. 9A shows an exemplary rendering 900 of an HTML document. The rendering 900 includes two user interface elements 912 and 916. Source HTML 950 corresponding to the rendering 900 is shown in FIG. 9B. In the example, the word "bold" is bolded via a bold directive, which is represented by the HTML tag "<B>." Any number of other tags can be used as formatting directives in a sequential tree.

Figure 10:
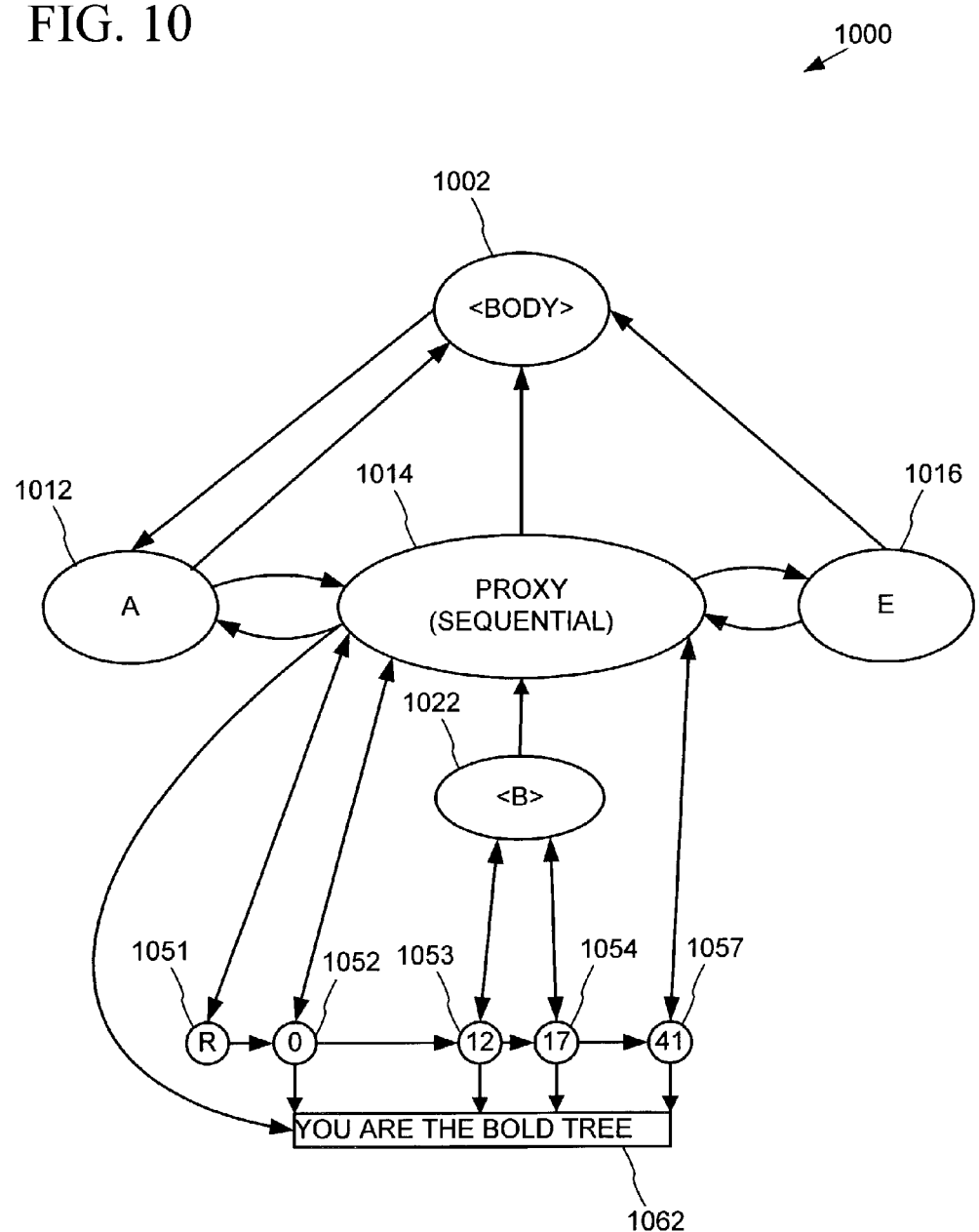
FIG. 10 is an exemplary hybrid tree for representing text intermingled with user interface elements, such as that of FIGS. 9A and 9B.

FIG. 10 depicts an exemplary hybrid tree 1000 representing the HTML document (e.g., as shown in the rendering 900 and the source 950). In the example, the nodes form a simple tree (e.g., with the root 1002), except that the hybrid tree 1000 includes a proxy node 1014, and nodes underneath the proxy node 1014 form a sequential tree by which the formatted text is represented. As in the other example described above, the linking data structure (e.g., the nodes 1051–1054 and 1057) can be represented as a splay tree; the numbers shown in the nodes need not be represented as shown in the example.

In the example, the proxy node 1014 serves the dual purposes of serving as a simple tree node (e.g., a sibling adjacent to the nodes 1012 and 1016) and serving as a root of a sequential tree (e.g., for the sequential text store 1062 and including the formatting directive 1022). Accordingly, the proxy node 1014 is sometimes called a "sequential proxy" and includes the following: a pointer to its parent (e.g., the root 1002), a pointer to its next sibling (e.g., the user interface element 1016), a pointer to its previous sibling (e.g., the user interface element 1012), and a pair of pointers enclosing positions in the sequential data store (e.g., the first and last position in the text store 1062 via the linking data structure nodes 1052 and 1057). Additionally, the sequential proxy can be defined as a sub-class of the same class from which the other nodes derive. The sub-class can include the following additional pointers: a pointer to the sequential data store (e.g., the text store 1062), and the root (e.g., node 1051) of the linking data structure.

In practice, the exemplary hybrid tree 1000 can differ significantly in that more or fewer nodes can be present, additional or less text can be present, and additional proxy nodes can be present. Also, the linking data structure can be implemented in various other ways.

Exemplary Hybrid Tree: Various Trees

Figures 11A, 11B:
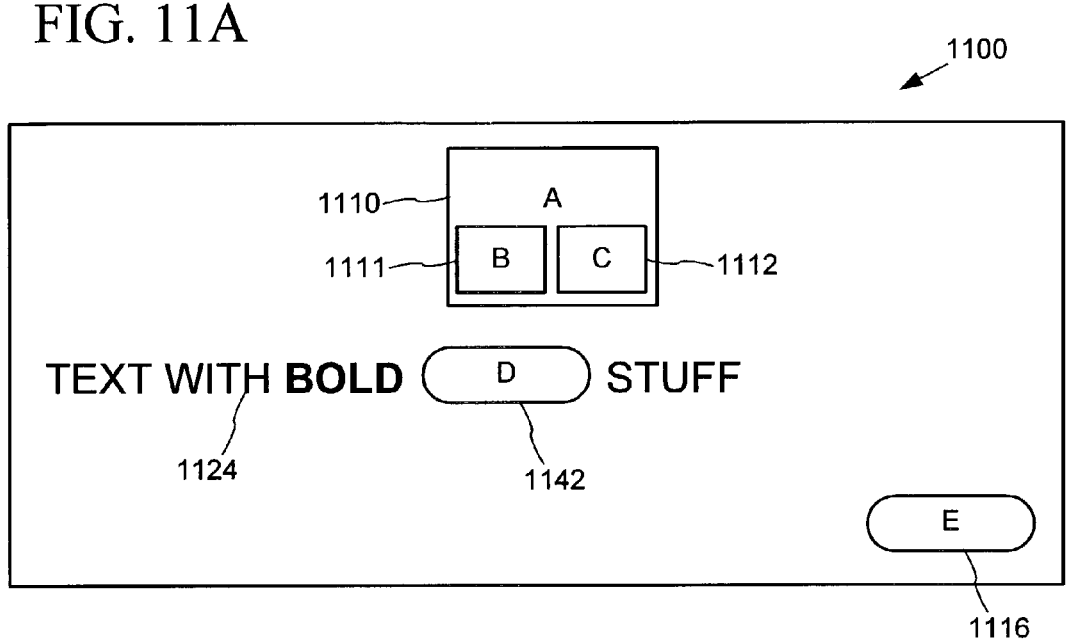
FIG. 11A is still other exemplary text intermingled with user interface elements.
FIG. 11B is an exemplary HTML document representing text intermingled with user interface elements, such as that of FIG. 11B.

FIG. 11A shows an exemplary rendering 1100 of an HTML document. The rendering 1100 includes various user interface elements 1110, 1111, 1112, 1142, and 1116. The user interface element 1111 and 1112 are considered to be children (e.g., within or aggregated by) the user interface element 1110. Source HTML 1150 corresponding to the rendering 1100 is shown in FIG. 11B. In the example, the word "bold" is bolded.

Figure 12:
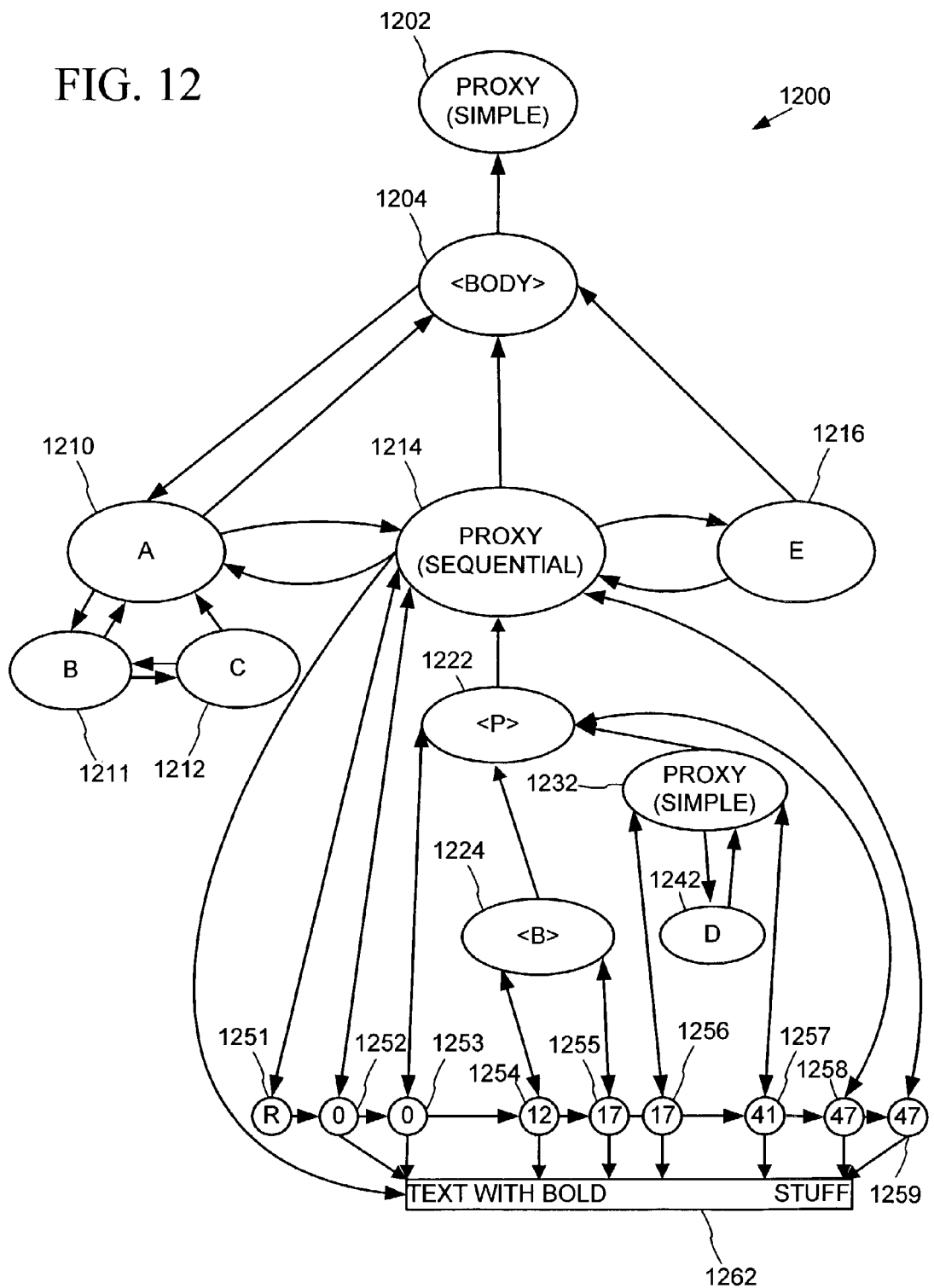
FIG. 12 is an exemplary hybrid tree for representing text intermingled with user interface elements, such as that of FIGS. 11A and 11B.

FIG. 12 depicts an exemplary hybrid tree 1200 representing the HTML document (e.g., as shown in the rendering 1100 and the source 1150). In the example, the hybrid tree 1200 takes the form of a simple tree with the root 1204 (or, alternatively, the proxy 1202 can be considered the root), but it has a sequential tree embedded in it via the proxy node 1214. Within the embedded sequential tree is another simple tree with the proxy node 1232 as the root.

The various nodes 1210, 1211, 1212, 1242, and 1216 representing user interface elements correspond to their counterparts depicted in the rendering 1100 and the source 1150. Various nodes 1222 and 1224 representing formatting directives correspond to their counterpart HTML tags depicted in the source 1150.

The linking data structure (e.g., the nodes 1251–1259) links the nodes representing formatting directives to the sequential data store 1262. As in the other examples, the linking data structure can be a splay tree.

The nodes 1202 and 1232 function as simple proxies (e.g., they embed a simple tree into a tree). The node 1214 serves as a sequential proxy (e.g., it embeds a sequential tree into a simple tree).

Although not shown, additional pointers can be used for sequential nodes (e.g., the nodes 1222 and 1224) and simple proxies (e.g., the nodes 1232 and 1202). These two types of nodes can include a pointer to the enclosing proxy root (e.g., an ancestor proxy node), if any. For example, the sequential node 1224 can include a pointer to the sequential proxy 1214, and the simple proxy 1232 can include a pointer to the sequential proxy 1214. Such a pointer can be useful for performing various operations.

As in any other sequential tree depicted herein, navigation can proceed in a bottom-up fashion. For example, given a particular character position in the linking structure, navigation can proceed up to the enclosing formatting directive (e.g., the bold directive 1224), indicating appropriate formatting to be applied to the characters enclosed thereby. Navigation can continue up the sequential tree, where other formatting directives may be found (e.g., the <p> directive, which is an HTML tag indicating a paragraph).

The formatting directives shown in the examples are exemplary only. Any number of others can be used (e.g., italics, emphasis, form, etc.). Corresponding HTML tags can be placed in the appropriate sequential tree.

Again, in practice, the exemplary hybrid tree 1200 can differ significantly in that more or fewer nodes can be present, additional or less text can be present, and additional or fewer proxy nodes can be present. Also, the linking data structure can be implemented in various other ways.

References and Pointers

In any of the examples described herein, what is depicted graphically as a single pointer may in fact be implemented as multiple pointers (e.g., multiple levels of indirection). In addition, various techniques can be used to reduce the number of pointers or nodes while still maintaining desired functionality.

Exemplary Alternative Representation of Sequential Tree

Figure 13:
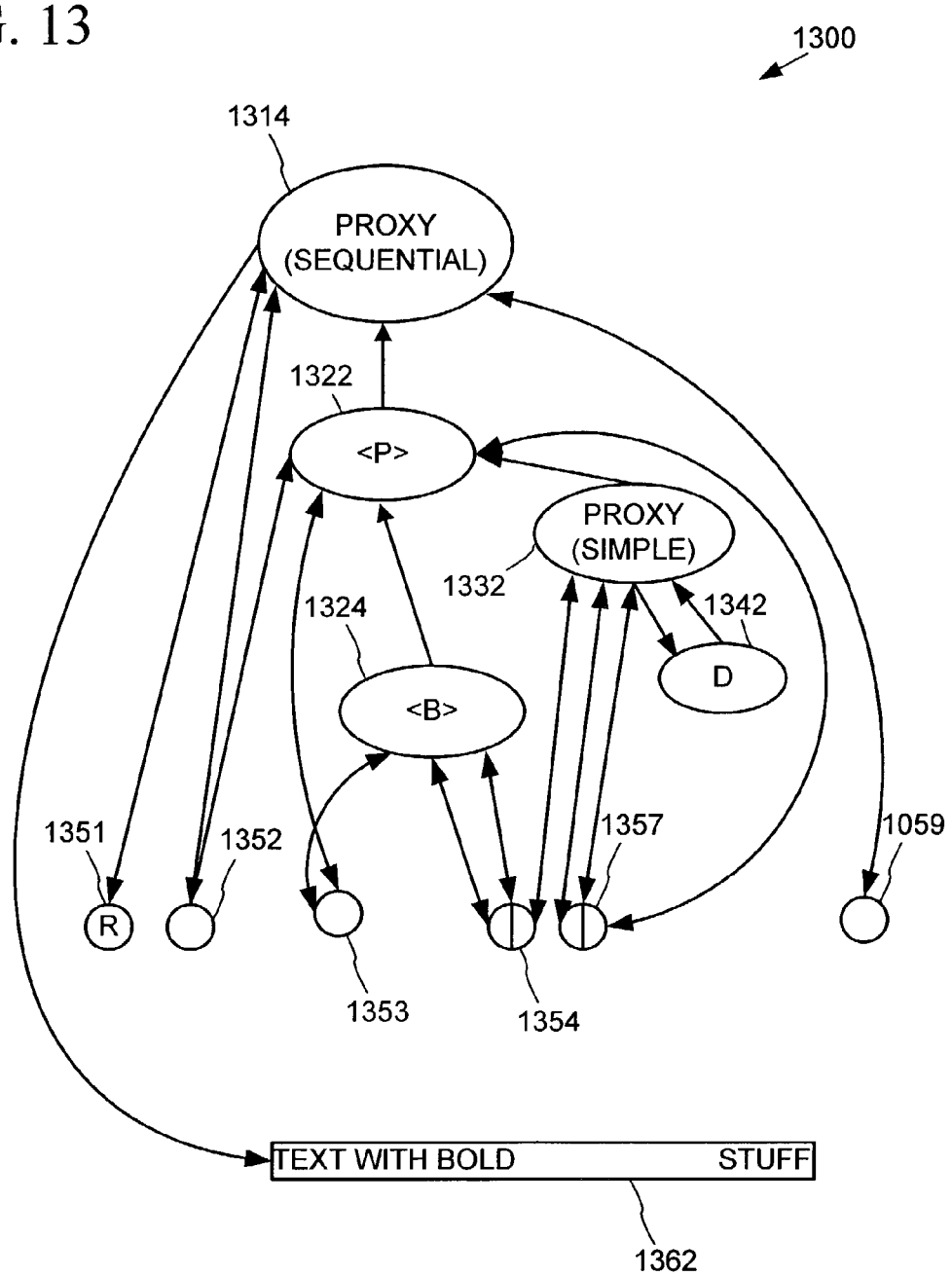
FIG. 13 is an exemplary alternative implementation of the hybrid tree of FIG. 12.

In some cases, an alternative representation of sequential tree (e.g., with a sequential proxy as its root) can be used. FIG. 13 shows an exemplary alternative representation 1300 of the sequential tree depicted in FIG. 12 having the root node 1214.

In the example, the nodes of the linking data structure form a splay tree and the splay nodes are composed of two halves (e.g., a Boolean variable can be used to indicate which half is specified or desired). Elements (e.g., the formatting directives) in the sequential tree have pointers to the splay node pair, but the elements are themselves considered to serve as part of the splay tree. Thus, another pointer back to the element is not necessary.

Thus, navigating the splay tree includes navigating through some of the elements. The elements can implement the same interface (e.g., set of method calls) as the splay nodes. Calls made to splay nodes that are actually elements can be delegated to the appropriate splay node. If, however, the call is made to determine an element associated with a splay node, the call is not delegated but instead returns a reference to the element (e.g., the self-referential "this").

Data Structure and Class Definitions

To facilitate efficient operation of hybrid trees, various data structure and class definitions can be used. For example, a class for hybrid tree nodes can be defined as having the data structure shown in Table 1.

TABLE 1

| Data Structure for Nodes | |
| --- | --- |
| TreeNode | m_parent; |
| object | m_next; |
| object | m_prev; |
| object | m_child; |

Depending on what function is served by the tree node, the data structure variables can have different meanings, as shown in Table 2.

TABLE 2

Functions of Variables

|  | Simple | Sequential | Simple Proxy | Sequential Proxy |
|---|---|---|---|---|
| m_parent | parent | parent | parent | parent |
| m_next | next | proxy root | proxy root | next |
| m_prev | previous | splay pointer pair | splay pointer pair | previous |
| m_child | first child | [not used] | first child | splay pointer pair |

Thus, if a node is designated as a simple tree node, it includes pointers to its parent, if any, the next sibling, if any, the previous sibling, if any, and its first child, if any. If a node is designated as a sequential tree node, it includes a pointer to its parent, if any, a pointer to the root of any proxy node under which the sequential tree resides, and a pair of splay pointers to the linking data structure nodes that enclose the text store associated with the sequential tree.

If a node is designated as a simple proxy (e.g., the root of a simple tree embedded in another tree), the node includes a pointer to its parent, if any, a pointer to the root of any proxy node under which the sequential tree resides, a pair of pointers to the linking data structure nodes that enclose the text store associated with the position in the sequential text store at which the simple tree is embedded, and a pointer to the first child of the node, if any.

If the node is designated as a sequential proxy (e.g., the root of a sequential tree embedded in another tree), the node includes a pointer to its parent, if any, a pointer to the next sibling, if any, a pointer to the previous sibling, if any, and a pair of pointers into the linking data structure nodes that enclose the text store associated with the sequential tree.

Further, the sequential proxy can be defined as a subclass that includes two additional instance variables shown in Table 3.

TABLE 3

Data Structure for Nodes

| TextArrayList | m_txtArray; |
|---|---|
| ITreePos | m_treepos; |
| bool | m_treePosBegin;// left or right half (e.g., of node 1354) |

The two additional instance variables represent a pointer to the text store (e.g., the text store 1362) associated with the sequential tree and a pointer to the root of the linking data structure (e.g., the root 1351 of a splay tree).

Thus, the various nodes of the hybrid tree (simple tree node, sequential tree node, simple proxy, and sequential proxy) can be defined to derive from the same object class. Further, the same variables in the data structures defining the nodes can be used for different functions (e.g., have different semantics) depending on the type of node. In an arrangement taking advantage of the depicted definitions, moving elements from one sub-tree to another is facilitated (e.g., at least some of the pointers might not need to be changed).

Operations on the Hybrid Tree

Various operations can be supported to facilitate use of the hybrid tree. Any number of these operations can be provided as part of an API, which is made available to programs by which hybrid tree technology can be utilized.

An exemplary operation is shown in Table 4. The operation adds a node to a tree. The exemplary operation takes at least four parameters: the prospective parent of the node to be added, if any, the prospective sibling of the node to be added, if any, the type of tree in which the node is to reside, and where the node is to reside (e.g., with respect to its siblings).

TABLE 4

Adding a Node

```
// Example of method for adding a node ("link")
enum TreeType
{
    Parent, // Take tree type of parent
    Simple, // Node is to be part of simple tree
    Sequential // Node is to be part of sequential tree
};
enum TreeLinkType
{
    Any, // Link anywhere. Should treat the same as LastChild
    BeforeSibling, // Link before passed sibling
    AfterSibling, // Link after passed sibling
    FirstChild, // Link at top (left) of parent's children
    LastChild, // Link at bottom (right) of parent's children
};
void Link(
    TreeNode parent,
    TreeNode sibling,
    TreeLinkType linkType,
    TreeType treeType)
{
    if (sibling is a direct child of a proxy node)
    {
        sibling = sibling.InternalParent; // Let the sibling be the proxy
    }
    Set up 'this' node to be able to live in the type of tree specified
by the treeType, If the treeType is Parent, then this node takes on the
same type as the parent node;
    if (parent is of a different type than the requested treeType)
    {
        TreeNode proxy = new proxy node of the correct type;
        Attach 'this' node as the first (and only) child of proxy;
        proxy.Link(parent, sibling, linkType, proxy node's type);
    }
    else
    {
        InternalParent = parent;
        If (node is being added to a sequential tree)
        {
            Splice (modify node tree, the splay tree and the text store) to
            add the node under the parent, adjacent to sibling;
        }
        else
        {
            Do the normal simple tree linking of setting up the direct
            sibling links based on linkType;
        }
    }
}
```

Given a particular node in the linking data structure (e.g., a splay tree), it is possible to determine a position (e.g., a character position) in the sequential data store. In one implementation, nodes store the number of characters in the node's left sub-tree. In this way, character positions can be easily calculated, and new characters can be added to the associated text store without significantly impacting performance.

A variety of functions can be performed given a particular character position (e.g., in the linking data structure). For example, it can be determined what formatting directives (e.g., HTML tags) enclose a particular character position. Such a function can be useful for rendering and text layout operations.

A variety of other operations and functions can be supported, such as a function that determines the neighbor of a node, a function that determines the parent of a node, function that determines what character positions are enclosed by a node, and so forth.

Sequential Data Store

Any of the sequential data stores described herein can be used to represent a variety of sequential data (e.g., text, audio, video and the like). The sequential data is ordinarily presented and perceived as contiguous (e.g., blocks of text). In practice, the sequential data store may be represented by a set of separate blocks. Each block can be padded with empty space (e.g., null values). In this way, additional data can be added at any arbitrary position by adding to the appropriate separate block. Otherwise, large copy and move operations might be necessary if adding a single character in the middle of a large contiguous span of sequential data.

The nulls need not be kept at the ends of the block. For example, in a block of 100 characters, there may be 70 characters with an empty pad of 30 at the end. If an insertion occurs at location 10, characters 10–70 can be moved to the end of the block, and the new character can be inserted at location 10. Accordingly, there are characters in locations 10–11 and 40–100, with a 29-character gap in the middle of the block. As a result, 29 more characters can be added without any additional shifting or copying.

In the illustrated examples, different sequential data stores can be used for the different sequential trees. However, it is possible to combine the sequential data stores for more than one sequential tree into a single logical store.

User Interface Elements

The user interface elements depicted herein can be any of a variety of user interface elements. For example, graphical pushbuttons, checkboxes, radio buttons, scroll bars, form fields, controls (e.g., controls adhering to the MICROSOFT ActiveX format or OCX's), and the like can be used. As new types of user interface elements are developed, they can be incorporated into the described technologies.

Linking Tree

Any of the linking data structures depicted herein can be implemented as a splay tree. In this way, the tree can be a binary tree that rebalances itself when new nodes are added to it. A threshold value can be specified so that rebalancing begins after the tree reaches a certain size (e.g., number of nodes).

Quad Tree Overview

To track linear spans of data in a sequential data store, a quad tree can be used. A quad tree is a data structure in which data comprising a pair (e.g., starting and ending positions) is organized via boundaries dividing a grid of the data into sub-grids (e.g., four sub-grids, thus the name "quad" tree). The sub-grids can be further (e.g., recursively) subdivided. In this way, determining whether a particular position of span is contained within a tracked span stored in the tree is more efficiently accomplished.

Typically, if data in the quad tree is modified (e.g., the data points move), the quad tree (e.g., boundaries for the grids or designated grids indicating where the data points lie) needs to be re-calculated. However, in certain situations (e.g., where the data points automatically move together as in a sequential data store scenario), a data point itself can serve as a grid boundary. In such a case, as data is added, the boundary automatically shifts and recalculation can be avoided.

In any of the depicted examples herein, spans of sequential data in a sequential data store can be tracked by a quad tree wherein at least one of the boundaries is itself a data point (e.g., a span). Tracking such spans can be helpful, for example, when designating areas of a user interface that are selected (e.g., highlighted) or annotated.

Figure 14A:
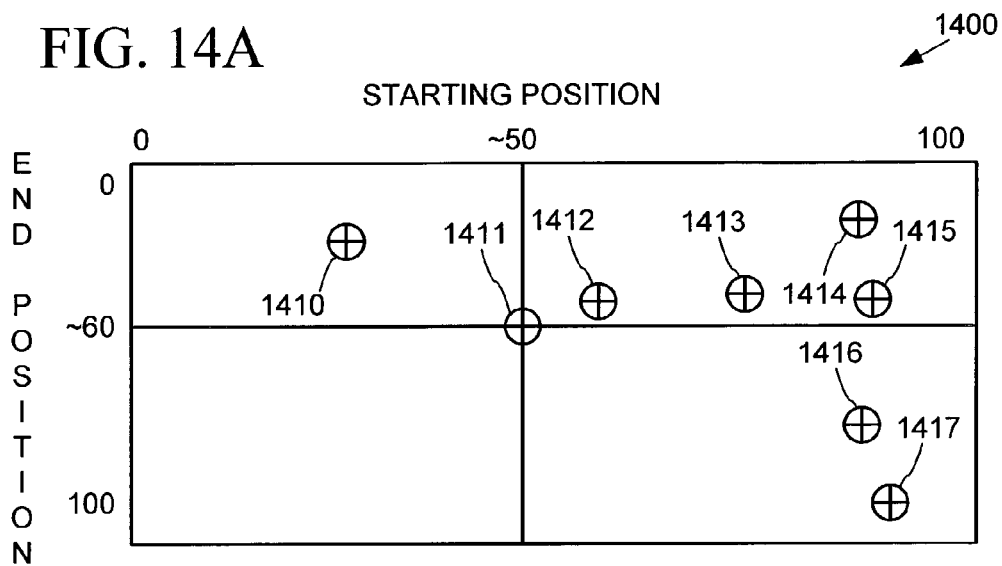
FIG. 14A depicts a quad tree for tracking spans of sequential data.
Figure 14B:
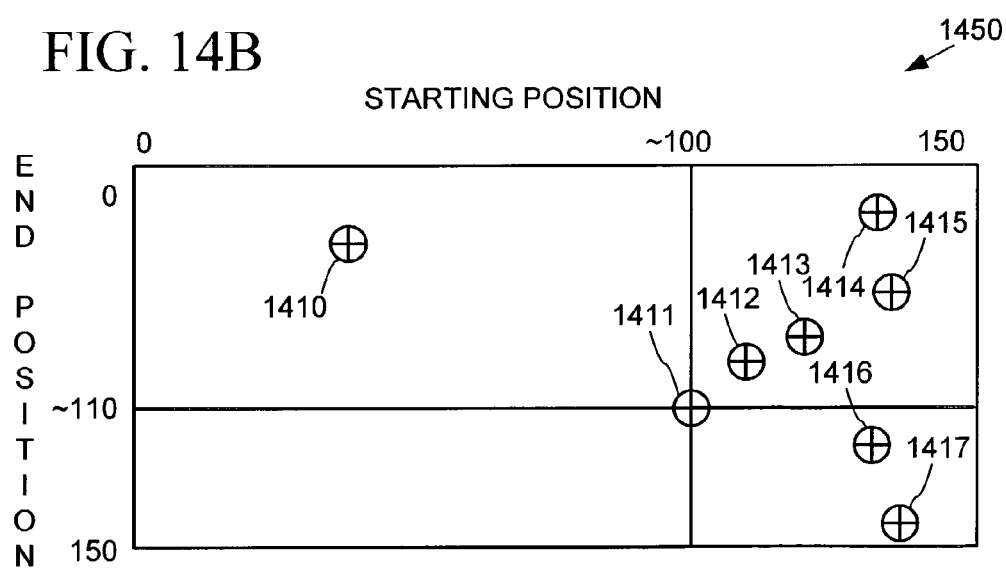
FIG. 14B depicts the quad tree of FIG. 14A after having added additional data.

FIG. 14 depicts a quad tree 1400 for tracking spans of sequential data. In the example, the 8 data points (e.g., points 1410–1417) track 8 spans of data within a sequential data store. The points can refer to a linking data structure (e.g., a splay tree in which the number of characters in the left sub-tree are stored). Point 1411 is special in that it both refers to a span of data (from position 50 to position 50) and it serves as a boundary, thus forming four quadrants: (0–50, 0–60), (50–100, 0–60), (0–50, 60–100), and (50–100, 60–100).

Accordingly, as data is inserted into the sequential data store, the positions of the points are automatically updated (e.g., due to the shifting of the text by the insertion). Such an arrangement is possible due to the fact that the data points maintain a neighborly relationship with one another (e.g., if point a's start value is less than point b's start value, such will be the case, even if additional data is added to the sequential data store). Accordingly, in a situation in which 50 characters are added to character position 25, the arrangement 1450 shown in FIG. 14B results. The point 1411 need not be changed because the nodes it refers to in the linking data structure now refer to different character positions. The point 1411 now refers to a span from position 100 to position 110 and it forms the following four quadrants (0–100, 0–110), (100–150, 0–110), (0–100, 110–150), and (100–150, 110–150).

Similarly, if data is removed, the grids automatically shrink. The grids can shrink such that they become zero size, in which case some grids can be coalesced. Although data is shown in two dimensions, it is possible to increase the dimensions and still take advantage of the described technology.

Exemplary Quad Tree

Table 5 shows an exemplary definition of data members that can be included in a class definition for a quad tree.

TABLE 5

Data Structure for Quad Trees private TreePos m_startLo;
private TreePos m_startHi;
private TreePos m_endLo;
private TreePos m_endHi;
private object m_segmentsOrGrids
private book m_hasSegments In the example, the first four members define the bounds of the four sides of the grid. These first four members serve as pointers into a hybrid tree (e.g., nodes of the linking data structure) that maintain their position as content is added or removed from the tree. The m_segmentsOrGrids member points to either a collection of sub-grids (e.g., if m_hasSegements is true) or a collection of data points for the particular grid (e.g., if m_hasSegments is false).

The data points used for grid boundaries can be shared between multiple grids, or each grid boundary can be represented by a different data point.

Alternatives

Having described and illustrated the principles of our invention with reference to illustrated embodiments, it will be recognized that the illustrated embodiments can be modified in arrangement and detail without departing from such principles.

Although some of the examples depicted herein show sequential data as text, implementations using audio, video, or some other sequential data can also be constructed.

Although some of the examples depicted herein show the technologies as applied to documents, the technologies can also be equally applied an any number of other scenarios, such as user interface representation (e.g., representing the user interface of a word processing or email program).

Although some of the examples of trees show nodes having various references or pointers to other nodes, some references or pointers can be omitted, added, or modified as desired. For example, a pointer to a last child can be used rather than a pointer to a first child. Also, in the case of a bi-directional pointer, a pointer in one direction can be used (e.g., in conjunction with some other mechanism for navigating in the other direction).

It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-readable storage medium comprising a data structure for representing a document, the data structure comprising:
   a plurality of nodes in a simple tree representing user interface elements appearing in the document;
   a plurality of nodes in a sequential tree, representing formatted sequential data in the document;
   at least one proxy node which serves as a node of the simple tree and as the root of the sequential tree; and
   wherein the only node shared between the simple tree nodes and sequential tree nodes is the proxy node.

2. The computer-readable storage medium of claim 1 wherein the document comprises a graphical user interface.

3. The computer-readable storage medium of claim 1 wherein at least one of the nodes of the simple tree represents a graphical button.

4. The computer-readable medium of claim 1 wherein a plurality of the nodes of the tree of the second tree type represent formatting directives for the formatted sequential data.

5. The computer-readable storage medium of claim 1 wherein at least one of the nodes of the sequential tree represents an HTML tag.

6. The computer-readable storage medium of claim 1 comprising:
   a sequential data store storing the sequential data of the document in unformatted form and referenced by the sequential tree.

7. The computer-readable storage medium of claim 1 wherein:
   a plurality of nodes of the simple tree comprise a pointer to neighboring nodes, if any, and a first child, if any;
   thereby adapting the simple tree to efficiently process presentation and navigation of user interface elements appearing in the document.

8. The computer-readable medium of claim 1 wherein the sequential data comprises text.

9. The computer-readable storage medium of claim 8 wherein a plurality of the nodes of the sequential tree refer to a span within the text, whereby text associated with the span within the text is thereby designated as formatted according to a formatting directive associated with a respective node of the tree, thereby adapting the sequential tree to efficiently process formatted sequential text in the document 10. The computer-readable storage medium of claim 9 wherein a plurality of nodes of the sequential tree refer to a span via a pointer to a tree referring to the text.

11. The computer-readable storage medium of claim 8 wherein the simple tree is adapted for efficient presentation and searching of the text represented therein.

12. The computer-readable medium of claim 1 wherein the proxy node serves as a root of the sequential tree but is referred to by the simple tree.

13. The computer-readable storage medium of claim 1 wherein the sequential tree is adapted for efficient presentation and navigation of the user interface elements represented therein.

14. The computer-readable storage medium of claim 1 wherein the proxy node serves as a root of the simple tree but is referred to by the sequential tree.

15. The computer-readable storage medium of claim 1 wherein nodes of the simple tree comprise the following references:
   a reference to a first child of the node, if any;
   a reference to an adjacent sibling in one direction, if any;
   a reference to an adjacent sibling in another direction, if any; and
   a pointer to a parent, if any.

16. The computer-readable storage medium of claim 15 wherein at least one of the nodes of the simple tree comprises a reference to an adjacent sibling in one direction and a reference to an adjacent sibling in another direction.

17. The computer-readable storage medium of claim 1 wherein the sequential tree comprises:
   nodes representing formatting directives for spans of data in the sequential data;
   a sequential data store storing the sequential data; and
   a linking data structure relating the formatting directives to the sequential data store.

18. The computer-readable storage medium of claim 17 wherein the linking data comprises nodes comprising:
   data indicating a position in the sequential data store; and
   an upwardly-directed reference to a related node representing a formatting directive for a span of data associated with the position.

19. The computer-readable storage medium of claim 17 further comprising:
   a quad tree for representing spans of data within the sequential data store.

20. The computer-readable storage medium of claim 19 wherein at least one of the quad tree boundaries is designated as corresponding to a node of the linking data structure.

21. The computer-readable storage medium of claim 19 wherein the quad tree is operable to automatically adjust at least one of its boundaries irrespective of data being added to the sequential data store.

22. The computer-readable storage medium of claim 1 wherein nodes representing formatting directives for spans of data in the sequential data point to enclosing parent elements, if any.

23. The computer-readable storage medium of claim 1 wherein at least one node of the simple tree at least node of the sequential tree, and at least one proxy node derive from the same object class.

24. A computer-readable storage medium comprising a hybrid tree data structure representing a document, the data structure comprising:
  a simple tree, wherein a plurality of nodes in the simple tree represent user interface elements of the document, wherein nodes in the simple tree comprise a pointer to a parent, if any, a pointer to a previous sibling, if any a pointer to a next sibling, if any, and a pointer to a first child, if any;
  a sequential tree, the sequential tree comprising a text data store storing text of the document, a plurality of nodes representing formatting directives for formatting spans of the text of the document, and a splay tree linking the formatting directives to the text of the document;
  one or more proxy nodes, the proxy node comprising a pointer to at least one simple tree node and at least one pointer to a root node of the splay tree; and
  wherein the only node shared between the simple tree nodes and the sequential tree nodes is the proxy node.

25. A computer-readable storage medium comprising a hybrid tree data structure representing a document, the data structure comprising:
  a simple tree, wherein a plurality of user interface representing means in the simple tree represent user interface elements of the document, wherein user interface representing means in the simple tree comprise a means for referring to a parent, if any, a means for referring to a previous sibling, if any, a means for referring to a next sibling, if any, and a means for referring to a first child, if any;
  a sequential tree, the sequential tree comprising a text data storage means for storing text of the document, a plurality of formatting directive representing means representing formatting directives for formatting spans of the text of the document, and a linking means for linking the formatting directive representing means to the text of the document;
  one or more combining means combining the simple tree and the sequential tree into a single, navigable data structure, wherein the combining means comprises a proxy node with a means for referring to a user interface element in the simple tree and a means for referring to a linking means in the sequential tree;
  wherein the proxy node is a hierarchical root of the sequential tree; and
  wherein the only node shared between the simple tree nodes and the sequential tree nodes is the proxy node.

26. A computer-readable storage medium comprising a hierarchical data structure representing a document, the data structure comprising:
  a sequential data store comprising contents of the document;
  one or more splay tree nodes comprising refernces to locations within the sequential dataq store;
  one or more element nodes associated, via the splay tree nodes, with one or more contiguous portions of the sequential data store, wherein the contiguous portions are thereby associated with elements associated with the element nodes;
  one or more simple tree nodes associated with navigable features of the document, wherein the nodes comprise pointers to adjacent nodes, if any, a first child node, if any, and a parent node, if any;
  one or more proxy nodes placing a set of one or more of the element nodes within a tree comprising one or more of the simple tree nodes, wherein the proxy node is a hierarchical root of the sequential tree; and
  wherein the only node shared between the simple tree nodes and the element nodes is the proxy node.

27. A computer-readable storage medium comprising a data structure comprising the following:
  one or more simple trees comprising a plurality of nodes representing hierarchically-arranged elements for display in a user interface;
  one or more sequential trees comprising at least one node representing elements arranged sequentially for display in the user interface and a plurality of hierarchically-arranged nodes controlling display of the elements arranged sequentially for display; and
  In at least one of the trees at least one proxy node serving as an indication of a location whereat the simple tree resides, wherein the proxy node is a hierarchical root of the sequential tree; and wherein the proxy node is the only shared node between the simple tree and the sequential tree.

28. The computer-readable storage medium of claim 27 wherein the simple trees are navigable in a top-down fashion.

29. The computer-readable storage medium of claim 27 wherein sequential trees are navigable in a bottom-up fashion.

30. The computer-readable storage medium of claim 27 wherein the node representing elements arranged sequentially for display in the user interface comprises a sequential store of text characters.

31. The computer-readable storage medium of claim 27 wherein the node representing elements arranged sequentially for display in the user interface comprises a sequential store of audio data.

32. An operating system service comprising:
  An application programming interface for accepting requests to add a proxy node to a tree data structure representing a document;
  wherein the operating system service is operable to add the proxy node as a node in at least a simple tree for storing html tags and as a root of a sequential tree for storing text;
  and wherein the only node shared between the simple tree and the sequential tree is the proxy node.

* * * * *